(12) United States Patent
Sivanantham et al.

(10) Patent No.: US 10,503,632 B1
(45) Date of Patent: Dec. 10, 2019

(54) IMPACT ANALYSIS FOR SOFTWARE TESTING

(71) Applicant: Amazon Technologies, Inc., Seattle, WA (US)

(72) Inventors: Sudhakar Sivanantham, Chennai (IN); Shweta Pednekar, Irvine, CA (US); Aaron Tang, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/146,648

(22) Filed: Sep. 28, 2018

(51) Int. Cl.
*G06F 11/36* (2006.01)

(52) U.S. Cl.
CPC ...... *G06F 11/3664* (2013.01); *G06F 11/3608* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 9,058,424 B1* | 6/2015 | Bienkowski | ........ | G06F 11/3684 |
| 10,303,587 B2* | 5/2019 | M | ........ | G06F 11/3684 |
| 2012/0159250 A1* | 6/2012 | Aull | ........ | G06F 11/2247 714/26 |
| 2014/0007068 A1* | 1/2014 | Cullen | ........ | G06F 8/65 717/169 |
| 2014/0298185 A1* | 10/2014 | Chen | ........ | G06F 16/958 715/738 |
| 2016/0162386 A1* | 6/2016 | Sivanesan | ........ | G06F 11/3672 717/124 |
| 2019/0179631 A1* | 6/2019 | Benedetti | ........ | G06F 8/71 |

* cited by examiner

*Primary Examiner* — Philip Wang
(74) *Attorney, Agent, or Firm* — Eversheds Sutherland (US) LLP

(57) ABSTRACT

Devices and methods are provided for providing software developer-driven analysis for the expected impact that a proposed software modification may have on software programs and devices. A device may receive files including a first file including indications of: (i) a feature modified by one or more software modifications, (ii) a sub-feature associated with the feature and modified by the one or more software modifications, and (iii) first information associated with the feature, and a second file including indications of: (i) the feature, (ii) the sub-feature, and (iii) second information associated with the feature. The device may determine a record including indications of: (i) the feature, (ii) the sub-feature, (iii) the first information, and (iv) the second information. The device may determine a test plan including one or more tests performed based on the record. The device may execute at least a portion of the test plan.

20 Claims, 6 Drawing Sheets

IMPACT ANALYSIS FOR SOFTWARE TESTING

BACKGROUND

Software applications may be designed to support a variety of devices and device features. When a software developer modifies software code for one or more applications which may be used by one or more devices, the developer may not be able to easily anticipate the effects that the modification may have on other software applications and devices which may execute those software applications. For example, a change to one software program may effect multiple related software programs used by multiple devices. Therefore, it may be difficult to determine and test the effects that software changes may have on software programs and devices.

Figure 1:
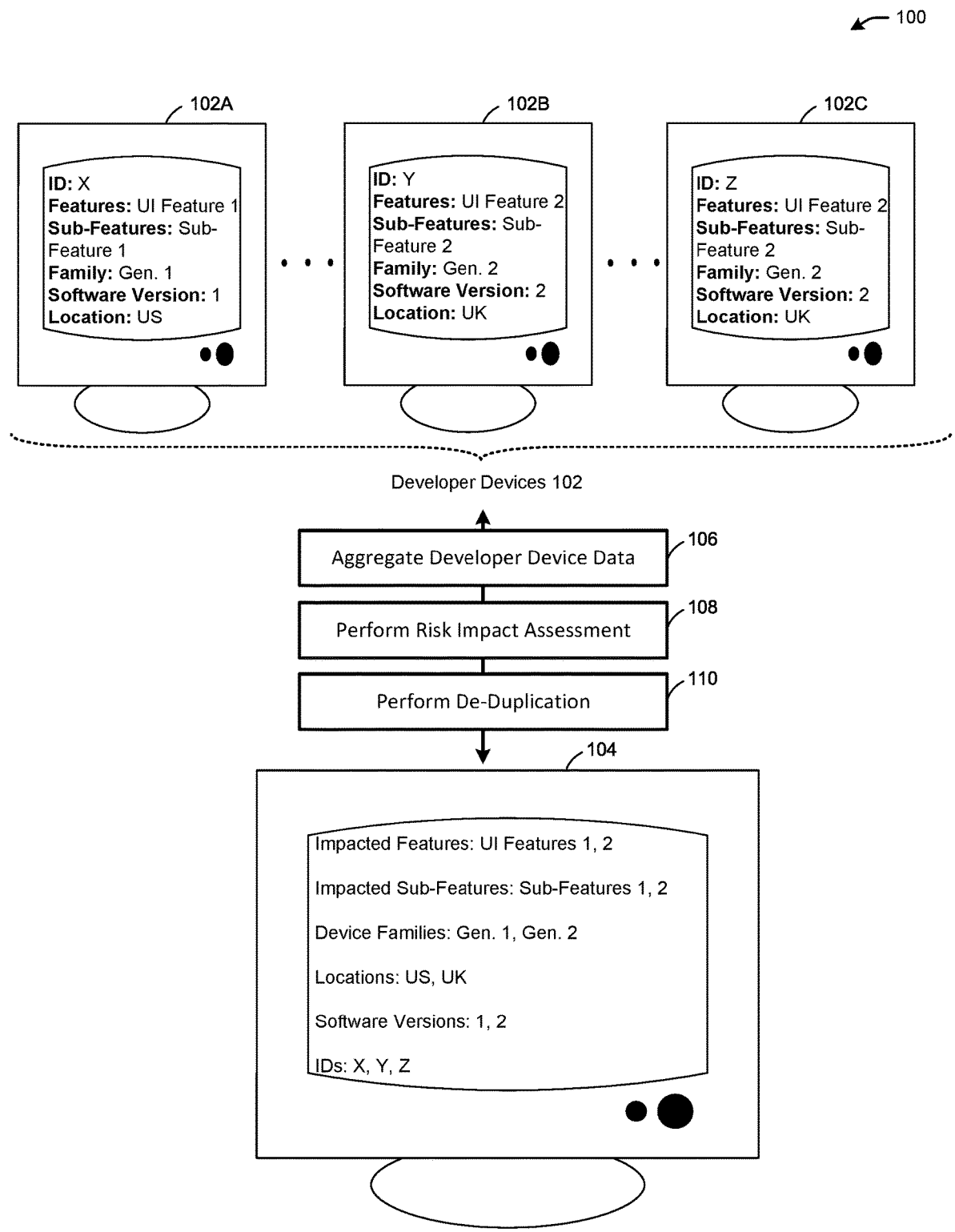
FIG. 1 illustrates an example process of generating a risk impact analysis for software modifications, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for analyzing and testing software changes using software developer input. An application database servicing multiple software applications for multiple types of devices may include many combinations of devices and device software. For example, a device sold in different countries may support the functionality of software programs designed in different languages. In addition, the software code may be complex, and a modification to one software program may affect the functionality of other software programs and devices using those programs. The testing of software changes may include significant resources and time when many devices and software programs may be involved, so the testing time and resources may be reduced by aggregating software developer input used to assess software code changes.

A risk-based software impact analysis tool may allow a software developer to provide software code impact estimates such as features/modules, device types/families, software versions, market locations, and other criteria which may be impacted by a software modification. The risk-based software impact analysis tool may provide an end-to-end service between software developers, quality assurance analysts, and testers. The time and resources needed to assess a software modification may be reduced using software developer inputs, thereby allowing faster deployment of software changes and reducing unforeseen changes to device functionality which may negatively impact user experience.

A user interface may be provided to software developers when the software developers intend to make software changes. The user interface may be used by developers to select regression modules affected by a JIRA® story/bug. A JIRA is a file/tool used for bug or issue tracking and/or project management. JIRAs may refer to program files which monitor issues and bugs related to computer workflow of software and applications. The user interface may allow for inputs such as a JIRA identifier for a JIRA, features (e.g., software modules/programs and sub-modules/programs), environments such as beta and gamma, components such as client, server-side rendering, etc., device families/types, operating system versions, geographic markets/locations, and other information associated with the JIRA. JIRAs are files/tools designed to be read by computers, and a collection of JIRAs may be aggregated and analyzed by a computer to identify the information associated with the JIRAs.

A software developer intending to make a software modification may enter information into a user interface. For example, the software developer may input user features which may be impacted by a software modification, such as a user interface feature. The features may be associated with a JIRA identified by an identifier which may be entered into the user interface. A feature/module/program may be associated with one or more sub-features. A user interface feature may include sub-features such as help, diagnose, and repair. A sub-feature may be populated automatically once a feature has been input by a developer. A risk-based testing tool may be hosted remotely from a client computer on which a software developer enters inputs, and the risk-based testing tool may aggregate inputs associated with JIRAs from software developers and determine the devices, programs, locations, etc. which may be impacted by the proposed software changes of the software developers.

When a software developer populates a user interface with estimated impact of proposed software changes and submits the information input to the user interface, a JIRA may be populated with the input information to indicate the features anticipated as being impacted by a proposed software modification. Each JIRA may include an identifier, and JIRAs may be aggregated based on common impact assessments. For example, if two JIRAs indicate changes to user interface programs used by a common device type, then the risk-based software impact analysis tool may aggregate the JIRAs indicating a common impact. The aggregated JIRAs and their respective information indicating estimated software modification impact may be organized and displayed by the risk-based software impact analysis tool in order to facilitate the development of tests which may assess the impact of proposed software changes. In this manner, a proposed software modification may not require testing on every type of device and related software program, but rather software tests may be developed and executed in a more customized fashion based on the software developer inputs.

As a result of embodiments of the disclosure, an end-to-end process including software developers, a risk-based software impact analysis tool, and testers may facilitate faster and better targeted analysis of proposed software modifications for software which may be supported by multiple types of devices.

In one or more embodiments, a user interface may be used by software developers to select regression modules to be monitored using a JIRA story/bug. Impacted device features and programs may be populated in the user interface from test rail modules (e.g., test case management software programs). After a software developer submits a risk impact using the user interface, the information may be populated in a JIRA, which may be updated/modified with risk impact information.

In one or more embodiments, a JIRA may indicate a JIRA type (e.g., bug), affected versions, components (e.g., operational), a status of a workflow, and other information such as a risk impact associated with a proposed software modification. For example, the risk impact may indicate features such as user interface features, sub-features such as help, diagnose, and repair, a client device type or family, a market/location associated with the device, etc.

In one or more embodiments, an impact risk report may be created after uploading a list of JIRAs. A risk-based analysis tool may aggregate impacted features into JIRAs. The JIRAs may include a risk impact JavaScript Object Notation (JSON) entered by software developers (e.g., the inputs of the user interface may be transmitted in JSON format). A user interface may allow for text, JSON, or other types of files to be selected for an impact analysis. A text file may include a list of JIRA identifiers. A JSON output may include JIRA identifiers. This way, the JSON identifiers may be included in the risk assessment. When the files/objects are loaded into a user interface and selected for an impact analysis, the risk-based analysis tool may create an analysis report.

In one or more embodiments, the analysis report generated by the risk-based analysis tool may present an organized and combined display of impacted JIRAs and features. For example, device user interface features, featured product data, and other features may be displayed when those features are anticipated to be impacted by a software modification. Sub-modules/programs associated with the features may be displayed. For example, if a user interface feature is likely to be impacted by a software modification, then sub-features such as a details page or help page may be displayed in the analysis report. If featured product data is to be impacted by a software modification, then the sub-feature of first time user experience may be impacted by the software modification and may be displayed by the analysis report. Device types and families may be displayed when determined to be impacted by a software modification. For example, generation 1, generation 2, etc. of certain device types may be indicated by the analysis report. The affected market/location where a device is used may be displayed by the analysis report. The affected software versions (e.g., operating system versions) may be displayed by the analysis report. The JIRA identifiers associated with affected JIRAs may be displayed by the analysis report. For example, multiple JIRAs may be associated with tracking the same features, device families, software versions, locations, etc., so multiple JIRAs may be shown in combination with a feature and with the devices, locations, software versions, etc. which may be impacted by a proposed software modification.

In one or more embodiments, some JIRAs may not be impacted by a software modification proposal. If a JSON is not included in a risk impact field of a JIRA, then the JIRA may not be impacted by a proposed software modification. The identifiers of JIRAs not impacted and therefore skipped during an impact analysis may be provided by the risk-based analysis tool to software developers along with the reason the JIRAs were skipped.

In one or more embodiments, a software developer may select a task to develop a new feature which may impact software programs and devices. The software developer may input a JIRA in a user interface and select software programs which may be impacted by a software modification used to develop the new feature. The input JIRA may be sent from the software developer via a user interface on a client computer to a risk-based tool (e.g., a web application) which may execute on one or more remote computers (e.g., servers). The risk-based tool may update a JIRA ticket with a JSON field listing impacted features, devices, and locations. The list of features and associated JIRAs which may be impacted may be aggregated by the risk-based tool and sent to a quality assurance analyst.

In one or more embodiments, a quality assurance analyst may send to the risk-based tool, using a client computer, a list of the impacted JIRAs on which to perform an impact analysis. The list may be in the form of a text file or JSON. The text file or JSON may indicate the impacted JIRAs on which to perform an impact analysis. The risk-based tool may receive a user input indicating a request to perform an impact analysis on the listed JIRAs. A command to perform the impact analysis may be provided to an impact analysis software program (e.g., a python program or other type of program), and the impact analysis software program, which may execute on the risk-based tool, may modify an HTML file or JSON file by including the areas which are determined by the impact analysis software program to be impacted areas which should be tested for the effects of a proposed software modification. The modified HTML or JSON file may be sent to a quality assurance analyst along with a file (e.g., an error file) indicating JIRAs which may be formatted incorrectly. A quality assurance analyst may input, via the risk-based tool, one or more test options for the impacted JIRAs and features. The risk-based tool may send one or more indications of the impacted JIRAs and features to a test rail program (e.g., a python program or other type of program), which may create a test plan for impacted JIRAs and features and may provide the test plan to a test rail tester. The quality assurance analyst may access a test plan and cause the tester to perform a created test plan. The results of the test plan execution may indicate the features, JIRAs, devices, etc. which may be affected by a proposed software modification.

In one or more embodiments, the risk-based tool may include a web interface which may allow a user to perform a risk impact analysis and create a test plan based on the analysis. The user interface may include a developer tool where software developers may add estimated risk impact inputs, and an impact analysis tool which may be used by a quality assurance analyst to identify impacted features and JIRAs to use in a focused regression for impact testing of a proposed software modification. A regression or test regression may refer to testing changes/modifications to computer software/programs to determine whether previous/existing versions of the software/programs will still function when the changes/modifications are applied.

In one or more embodiments, a software developer tool may include or access a risk impact controller which may manage logical operations used to submit a risk into a JIRA. Device names/types, locations, software versions, and test modules may be prepopulated using a risk impact form in a user interface supported by the risk impact controller. Application programming interfaces (APIs) provided by a test rail may be used to obtain test modules. Software developers may select impacted devices, locations, software versions, environments, and test modules for a JIRA task, add a JIRA identifier, and select a risk impact analysis task (e.g., clicking a risk impact button in the user interface). The risk impact controller may call a JIRA API to update a JIRA by providing updated features in the form of a JSON.

In one or more embodiments, a test rail controller may find a specific test rail project and provide test suites and sections of a test project to a user by using one or more software functions/commands (e.g., getProject, getSuite, etc.). For example, all test suites associated with a tablet project may be provided to a user to consider for a test regression suite. Any section from one or more test regression suites may be presented to a user to allow the user to specify focused areas of regression testing (e.g., devices, software versions, locations, etc.).

In one or more embodiments, the risk-based tool may include a test rail controller, which may process a list of JIRAs and create a test plan relevant to impacted areas and features indicated by the JIRAs. A user may upload a text file, JSON file, or other type of file indicating the list of JIRAs, and the list of JIRAs may be provided by the risk-based tool to a software script (e.g., a python script). The software script may identify impacted areas/features and their respective JSONs for each listed JIRA. When a JSON is taken from a JIRA, the JSON may be added to an output dictionary (e.g., in a two-dimensional matrix). A resulting dictionary of JSONs may be generated and sent to another software script (e.g. a python script), which may generate test suites. To generate test suites, the software script may parse impacted features/areas based on their respective regression impact, markets/locations, and devices. A test suite may be generated by the software script using multiple test runs based on different permutations of devices, markets/locations, and affected features. For example, if a new feature of a software modification affects in-application purchases (IAPs) in the U.S. for a type of device, and also affects a detail page for US and foreign locations where the type of device and other types of devices may be used, a test suite may be generated with different permutations, such as: (1) Device 1, U.S., Sections IAP/Detail Page, (2) Device 1, U.K., Sections Detail Page, (3) Device 1, Germany, Sections Detail Page, (4) Device 2, U.K., Sections Detail Page, and (5) Device 2, Germany, Sections Detail Page.

In one or more embodiments, a single JSON pulled from a JIRA task may include the following impacted areas: device names, markets/locations, software versions, environment and test modules, etc. There may be multiple JIRA tasks impacting the same area. So, while aggregating data from a JSON of affected tasks, de-duping may be useful. De-duping may be performed in the following manner. Each JSON may processed in such a way that a test module name is treated as a main key. A resulting output dictionary may be represented by a 2-D matrix where each key is a pair (X,Y) such that X is a test module name and Y is one of the other impacted areas (e.g., JIRA ID, environment, software versions, devices, markets/locations, and additional information). A value of each key-pair may be represented in the form of a list. The list may be created after de-duping with the help of a set. For example, for a test module name X, all the impacted device names may be aggregated in a list and then de-duped with a set. The set may be converted to a list and added to the output dictionary where the respective test module name is the first key (X) and "deviceFamilies" is the second key. Similar values may be populated for other areas, such as JIRA ID, environment, software versions, markets/locations, and additional information for a respective test module name. Once all the values are populated for each key-pair (X,Y), the output dictionary may be sent to a test rail software script (e.g., a python script).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 of generating a risk impact analysis for software modifications, in accordance with one or more example embodiments of the present disclosure.

Referring to FIG. 1, the process 100 may include one or more software developer devices 102 (e.g., developer device 102A, developer device 102B, developer device 102C) which may receive software developer inputs indicative of software modifications and impacted JIRAs, software features/modules, sub-features/sub-modules, device types/families, software versions, markets/locations, and other areas expected to be impacted by proposed software modifications. The one or more software developer devices 102 may receive software modification proposals and impacted area assessments from software developers, and may provide the list of impacted JIRAs and features to a risk-based tool web application executed by one or more computers (e.g., computer 104). The one or more computers may collect all entries of JIRAs and impacted areas, may determine the areas which may be impacted by proposed software modifications, and may present an organized summary of the JIRAs and features which may be tested for their expected impact if the proposed software modifications submitted by the one or more developer devices 102 were implemented.

For example, developer device 102A may present a user interface used by software developers to identify and select regression modules which may be affected by a JIRA story/bug associated with proposed software modifications. The user interface may provide one or more user-selectable fields or fields in which a developer may enter information. The fields of the user interface may include a JIRA identifier, features/modules (e.g., user interface features for software which may be executed on one or more device types, back up programs, restore programs, debug programs, etc.), sub-features/sub-modules (e.g., help features, diagnose features, repair features, etc.), device types/families (e.g., smartphone, tablet, the respective generation of a device, etc.), a software version (e.g., operating system version 1, operating system version 2, etc.), markets/locations where the software may be used (e.g., where a device using the software may be sold), and additional information which may help identify which features, devices, JIRAs, etc. may be impacted by a proposed software modification. The developer device 102A shown in FIG. 1 may receive one or more indications from a software developer that a developer's proposed software modification may impact JIRA identifier X, user interface feature 1, sub-feature 1 (which may be auto-populated when user interface 1 is entered), device family generation 1, operating system (OS) version 1, and devices sold in the U.S.

Developer device 102B may receive one or more indications from a software developer that a developer's proposed software modification may impact JIRA identifier Y, user interface feature 2, sub-feature 2 (which may be auto-populated when user interface feature 2 is entered), device family generation 2, OS version 2, and devices sold in the U.K. Developer device 102C may receive one or more indications from a software developer that a developer's proposed software modification may impact JIRA identifier Z, user interface feature 3, sub-feature 3 (which may be auto-populated when user interface feature 3 is entered) device family generation 3, OS version 3, and devices sold in China (CN). The inputs received from the developer device 102A, developer device 102B, and developer device 102C may be sent to computer 104.

Computer 104, using the risk-based tool, may aggregate the developer device data (e.g., software impact assessment data) from the one or more developer devices 102 at step 106, and may perform a risk impact assessment on the aggregated data at step 108 to determine possible impacted areas, features, JIRAs, etc. For example, the computer 104 may identify from the aggregated developer impact data that among the impacted areas/features anticipated by software developers are user interface features 1 and 2, and may identify the device families, locations where the user interface features may be used, software versions, JIRA identifiers, and other information indicated by the inputs provided by software developers as potentially being impacted by proposed software modifications. Aggregation may include determining JIRAs with common features, and aggregating the other information such as device families, location, and software versions having a common feature. Performing a risk impact assessment may include determining the impacted information such as device families, location, and software versions, and including the impacted information in a file which may be parsed by the computer 104 to determine the impacted information and tests to be performed on the impacted information and features.

At step 110, the computer 104 may perform a de-duplication process (de-duping). For example, while aggregating the data, duplicate information may be identified by multiple entries. JIRAs or other project management files used by developers to enter impacted features may indicate the same features. Rather than creating duplicate tests for features indicated multiple times, de-duping may remove duplicate entries. A file may be processed in such a way that a test module name is treated as a key, and an output dictionary represented by a 2-D matrix may be created, where a key may be a pair (X,Y) such that X may represent a test module name and Y may represent one of the other impacted areas (e.g., JIRA identifier, environment, software versions, devices, locations/markets, and additional information). A value of each key-pair may be in the form of a list. The list may be created after de-duping with the help of a set (e.g., a duplicate key value/pair may be excluded from the list). For example, for a test module of name X, impacted device names may be aggregated in a list and then de-duped with a set. The set may be converted to a list and added to the output dictionary where the respective test module name may be the first key (X) and "deviceFamilies" may be the second key. Similarly, values may be populated for other areas like JIRA identifier, environment, software versions, locations/markets, and additional information for a respective test module name. Once all values are populated for each key-pair (X,Y), the output dictionary may be sent to a computer script designed to create tests for the impacted areas (e.g., a create_testrail.py python script).

Still referring to FIG. 1, the computer 104 may provide an indication that the possible impacted features include user interface features 1 and 2, device families of generations 1 and 2, devices sold in the U.S. and U.K., devices using operating system versions 1 and 2, and JIRAs X, Y, and Z. Rather than having to provide individual JIRAs and their associated impacts, the risk-based tool executed by the computer 104 may facilitate simplified aggregation of developer inputs regarding possible impacted areas and features of devices and software. The presentation of the possible impacted features may be organized into multiple entries based on the features, or may present any combination of features and associated information that is determined to be impacted by software modifications. In one embodiment, individual records may be determined and displayed, with an individual record including any of the device families, locations, software versions, and/or JIRA identifiers associated with a feature and sub-feature.

The aggregated and organized developer-provided data may allow a user to design test suites to test the impacted features, devices, etc. For example, if a test were executed on a single JIRA, device type, and software version, but other JIRAs, device types, and software versions may be impacted by a software modification, then results of the test may not provide a complete picture to a user analyzing proposed software modifications for their impact. Rather than a user collecting software modification proposals and attempting to identify each impacted area, and designing test suites for those areas to test the impact of proposed software modifications on various software programs, modules, applications, devices, etc., the risk-based tool may read the JIRAs and determine the possible effects of the software modification proposals, and may present the information associated with the JIRAs to a user with the computer 104. The user of the risk-based tool may allow software developers to provide inputs indicating possible effects of software modifications, and may facilitate aggregation of such inputs using computer-designed JIRAs to determine and present impact assessments for the development of test suites used to test the impact of the proposed software modifications.

Figure 2:
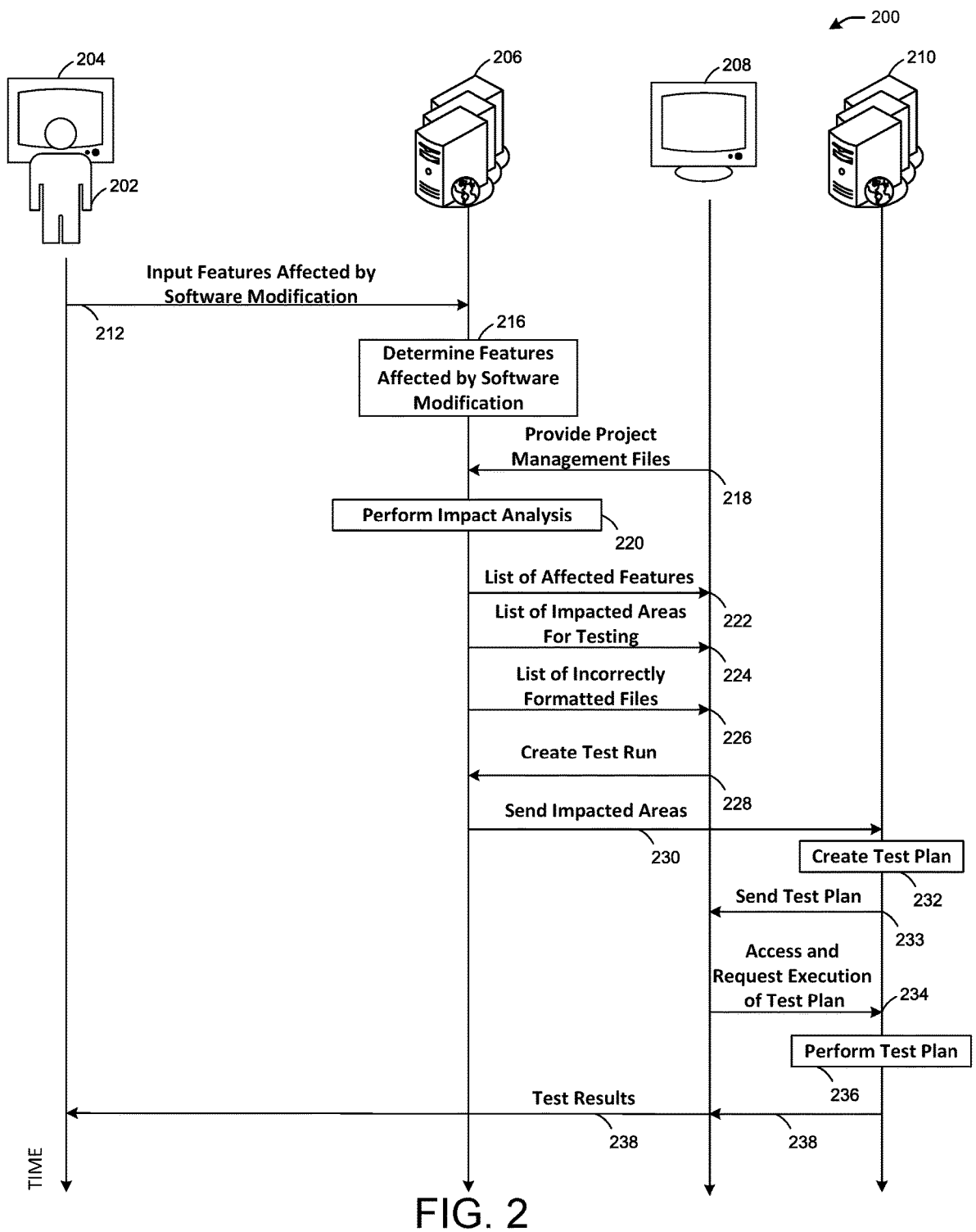
FIG. 2 illustrates a process for generating a software modification impact analysis, in accordance with one or more example embodiments of the present disclosure.

FIG. 2 illustrates a process 200 for generating a software modification impact analysis, in accordance with one or more example embodiments of the present disclosure.

Referring to FIG. 2, the system 200 may include a user 202 of a developer computer 204, a risk-based tool 206, a quality assurance computer 208, and a test rail tool 210.

At step 212, the user 202, who may be a software developer, may input one or more project management files (e.g., JIRAs) to the developer computer 204, which may send the project management files to the risk-based tool 206. The software developer may intend to develop a new software feature by modifying existing software. The software developer may input JIRAs/files (e.g., into a user interface provided by the developer computer 204). The JIRAs/files may include indications of software programs/features, sub-features, device types, geographic locations of use, software versions, and other information indicating possible modifications caused by proposed software modifications to features/programs such as user interfaces, parental controls, user insider, and others. The user 202 may input a risk impact at the developer computer 204, which may provide the risk impact to the risk-based tool 206. The user 202 may select software programs/modules from the test rail tool 210 which the software developer indicates may be impacted by a software modification. For example, user interface software, back up and restore programs, device types/families, software versions, locations/markets, and other relevant information may be selected as possibly impacted by a proposed software modification. The selections may be provided into input fields and/or selected from a list of features and programs. The impacted features may be provided with a JIRA having a JIRA identifier.

At step 216, the risk-based tool 206 may collect JIRAs, analyze the selected features indicated by the JIRAs, and determine impacted areas. For example, if one or more JIRAs indicate that an impacted area includes parental controls, JIRAs indicating parental controls may be aggregated and analyzed for their impact assessment. The device types/families, the locations/markets where the devices are used, the software versions, and the JIRA identifiers associated with JIRAs with parental controls selected may be grouped. Other impacted areas may include intents, deep links, and insider exclusives (e.g., including sub-features such as clickstream test cases, first time user experience, and accessibility). If multiple JIRAs are aggregated because they indicate commonly impacted features, then the JIRAs may be included in an impact analysis report.

At step 218, the quality assurance computer 208 may provide (e.g., upload) project management files (e.g., JIRAs). The list of JIRAs may be included in a JSON or text file uploaded via a user interface. The JSON or text file may indicate the JIRA identifiers on which to perform an impact analysis. At step 220, the risk-based tool 206 may perform an impact analysis on the impacted areas indicated by the JIRAs. For example, a user selection may indicate a request to perform an impact analysis on the JIRAs indicated by the JSON or text file. The impact analysis may include evaluating whether a proposed software modification may affect features indicated by the JIRAs. The impact analysis may be performed by a computer script (e.g., a python script).

At step 222, the risk-based tool 206 may provide the list of impacted areas to the quality assurance computer 208. The list of impacted areas may include a presentation (e.g., a chart) which lists impacted areas/features, sub-features, device types/families, locations/markets, software versions, and JIRA identifiers. The list may include multiple impacted features and the respective sub-features, device types/families, locations/markets, software versions, and JIRA identifiers associated with the impacted features. Thus, rather than each JIRA being listed individually, the JIRAs may be aggregated, and the common impacted areas may be grouped for convenient presentation.

Once the computer script has performed the impact analysis, at step 224, the risk-based tool 206 may provide, to the quality assurance computer 208, an indication of impacted areas to test for the affects of a proposed software modification. The indication of impacted areas may be output to an HTML file and/or JSON. At step 226, the risk-based tool 206 may provide a list of incorrectly formatted files. For example, an indication of incorrectly formatted JIRAs may not be considered in the impact analysis, and the incorrectly formatted JIRAs may be indicated in an HTML file (e.g., an error file) so that the quality assurance computer 208 may identify any JIRA which was not assessed in the impact assessment for possible effects of a proposed software modification.

At step 228, the quality assurance computer 208 may select one or more test run options, including possible features to test. The test run options may be indicated by a "create test run" input received by and/or determined by the quality assurance computer 208. The test run option input(s) may indicate a request to create one or more test rails based on the impacted features to be tested for effects of a proposed software modification.

At step 230, the risk-based tool 206 may send the impacted areas/features indicated by the test run options to a computer script (e.g., a python script) which may be accessed by the risk-based tool 210 and/or the test rail tool 210. The computer script may create a test plan at step 232. The test script may be determined by the test rail tool 210, or provided to the test rail tool 210. At step 233, the test rail tool 210 may provide the test plan to the quality assurance computer 208. The test plan may include one or more tests which may be performed on the impacted areas/features.

At step 234, the quality assurance computer 208 may access and request execution of the test plan at the test rail tool 210. The request may indicate that any tests of the test plan may be run. The test plan may test one or more selected areas/features indicated as being potentially impacted by a proposed software modification. The test plan may identify whether the proposed software modification will impact a given feature, program, device, etc. For example, all software suites (e.g., computer programs) and sections of related functionality may be collected by the test rail tool 210, and the suites and sections indicated as impacted (e.g., based on the input JIRAs and their associated features) may be identified by the test rail tool by matching the features to the suites and sections of software code. At step 238, the test rail tool 210 may provide test results to the risk-based tool 206, which may provide the results to any of the devices. The test results may indicate which features are impacted by a proposed software change.

In one or more embodiments, the risk-based tool 206 may include a web interface that provides a user a way to execute a risk impact analysis and create a test plan based on the features indicated by the impact analysis. The user interface may include a software developer tool which may be used by software developers (e.g., user 202) to provide risk impact associated with a proposed software modification, and an impact analysis tool which may be used by the quality assurance computer 208 to determine the impacted areas for focused regression.

Figure 3:
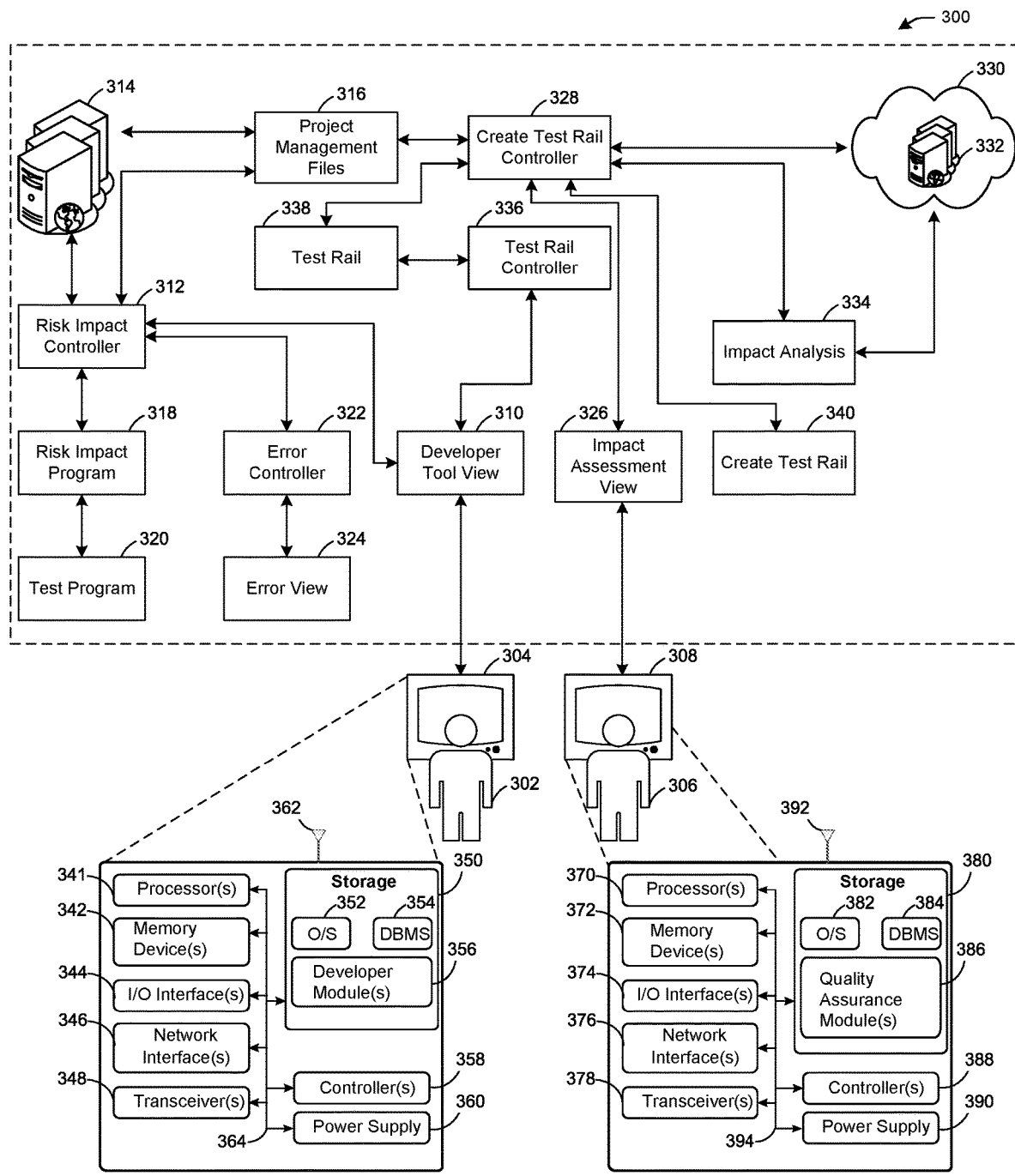
FIG. 3 depicts a system for generating a software modification impact analysis, in accordance with one or more example embodiments of the present disclosure.

FIG. 3 depicts a system 300 for generating a software modification impact analysis, in accordance with one or more example embodiments of the present disclosure.

Referring to FIG. 3, the process system 300 may include a software developer 302 using a software developer computer 304, a quality assurance user 306 using a quality assurance computer 308, an developer tool view 310, a risk impact controller 312, a credentials retriever 314, one or more project management files 316 (e.g., JIRAs), a risk impact module/program 318, a test module/program 320, an error controller 322, an error view 324, an impact assessment view 236, a create test rail controller 328, a computer cloud 330 hosting cloud storage 332, an impact analysis computer program 334, a test rail controller 336, a test rail 338, and a create test rail computer program 340.

Still referring to FIG. 3, the software developer computer 304 and the quality assurance computer 308 may include one or more components. For example, the software developer computer 304 may include one or more processors 341, one or more memory devices 342, one or more input/output interfaces 344, one or more network interfaces 346, one or more transceivers 348, storage 350 (e.g., which may store one or more operating systems 352, one or more database management systems 354, and one or more developer modules 356), one or more controller 358, a power supply 360, one or more antenna(e) 362, and one or more bus(es) 364. The quality assurance computer 308 may include one or more processors 370, one or more memory devices 372, one or more input/output interfaces 374, one or more network interfaces 376, one or more transceivers 378, storage 380 (e.g., which may store one or more operating systems 382, one or more database management systems 384, and one or more quality assurance modules 386), one or more controller 388, a power supply 390, one or more antenna(e) 392, and one or more bus(es) 394.

The software developer computer 304 may receive risk impact inputs from the software developer 302 and may provide the risk impact inputs to the developer tool view 310 (e.g., a user interface displayed by the software developer computer 304). For example, the software developer 302 may provide inputs to a user interface, the inputs indicating features, devices, and software estimated to be impacted by a software modification proposed by the software developer 302. The software developer tool view 310 may list software programs/modules from the risk impact controller 312. For example, the risk impact controller 312 may include software functions such as populateDeviceNames( ), populateLocations( ), addRiskImpact( ), etc., which may use areas provided by the risk impact program 318. Areas may include JIRA identifier, features, device families/types, software versions, locations, and other areas which may be impacted by a proposed software modification. The test program 320 may provide to the risk impact program 318 a model including a name, identifier, and sub-features to be tested. The features/areas may be automatically populated. For example, available features/areas for the software developer 302 to select may be auto-populated and presented for selection. When a feature (e.g., user interface feature) is selected, sub-features associated with the selected features may auto-populate for selection. The selectable features/areas which may be impacted by a software modification may be stored in the project management files 316.

The risk impact controller 312 may use the credentials retriever 314 to verify security credentials of a user (e.g., a virtual/robot/computer-automated user) and to retrieve JIRAs that the software developer 302 is permitted to access. For example, the project management files 316 (e.g., JIRA files) may be updated and provided by a computer-automated user which may collect potentially impacted areas indicated by the software developer 302. The risk impact controller 312 may receive modules from the project management files 316 (e.g., from the computer-automated user). The credentials retriever 314 may access JIRAs from the project management files 316. The risk impact controller 312 may add programs/modules to the project management files 316. For example, the risk impact controller may add software functions such as populateDeviceNames( ), populateLocations( ), addRiskImpact( ), etc. to the project management files 316. The programs/modules provided by the developer tool view 310 (e.g., impacted areas indicated by user input) to the risk impact controller 312 may be provided by the risk impact controller 312 to the project management files 316 so that JIRAs may be updated with areas estimated to be impacted by a proposed software modification.

When JIRAs are incorrectly formatted and are not assessed for their impacted areas, then the risk impact controller 312 may use the error controller 322 to generate an error page indicating the unused JIRAs. The error controller 322 may provide the error page indicating non-assessed JIRAs to the error view 324, which may be presented by the software developer computer 304 and/or the quality assurance computer 308.

The quality assurance computer 308 may upload JIRA identifiers to the impact assessment view 326 (e.g., a user interface where JIRA identifier may be input as a JSON or text file). The impact assessment view 326 may be presented on the quality assurance computer 308, and may operate using functions such as openReport( ) and createTestRun( ). The developer tool view 310 may receive programs/modules from the test rail controller 336, such as getProject( ), getSuite( ), getSection( ), etc. The test rail controller 336 may read from the test rail 338. The create test rail controller 328 may create a test run using the test rail 338 and functions such as upload( ), createTestRail( ), readFile( ), etc.

The create test rail controller 328 may access and use the cloud storage 332, which may upload JIRA identifiers. The impact analysis computer program 334 (e.g., a python script) may read JIRA identifiers from the cloud storage 332, and may execute a function to receive an impacted areas report. The create test rail controller 328 may call the impact analysis computer program 334, read the impacted areas from the JIRAs in the program management files 316, create a test run using the test rail 338. The create test rail controller 328 may call the create test rail computer program 340, which may execute a python script to create a test rail for the impacted areas.

The impact assessment view 326 may access the create test rail controller 328 to create a test run for the impacted areas. A report (e.g., as shown at computer 104 in FIG. 1) may indicate impacted areas such as features, sub-features, device types/families, locations where the devices are used, software versions, and JIRA identifiers impacted by a software modification proposed by the software developer 302 and/or other software developers.

In one or more embodiments, the risk impact controller 312 may control logic used to submit a potential risk/impact into a JIRA. Currently-supported device names, locations, software versions, environments, and test modules may be prepopulated using a riskImpact form in a user interface supported by the risk impact controller 312. Such may allow a user to see and select the Currently-supported device names, locations, software versions, environments, and test modules which may be impacted by a proposed software modification. Because test modules may be stored separately in the test rail 338, application programming interfaces (APIs) provided by the test rail 338 may used to pull the modules (e.g., using the test rail controller 328), and the methods provided by the test rail controller 328 may be called in the riskImpact form. Software developers (e.g., software developer 302) may select the impacted device names, locations, software versions, environments, and test modules for their respective JIRA task, add the JIRA identifier, and then click an "Add risk" impact button or provide some other input. The risk impact controller 312 may call a JIRA API to update the identified JIRA (e.g., based on the JIRA identifiers) with the updated programs/modules in the form of a JSON.

In one or more embodiments, the test rail controller 328 may identify a specific test rail project (e.g., using functions such as getProject, getSuites, getSuite, getSecetions, and getSection) and present the relevant test suites and sections of that project to the software developer 302. For example, the system 200 may examine a project for a particular device type and identify all the suites used by the device type. Multiple identified suites may be presented by the system 200 to the software developer 302, including regression suites. The software developer computer 304 may display any section from the identified suites to allow the software developer 302 to indicate (e.g., via one or more inputs) which part of regression testing on which to focus.

In one or more embodiments, the create test rail controller 328 may manage the logic supporting receiving a list of JIRAs and creating a relevant test plan from the impacted areas (e.g., as indicated by the JIRAs). The create test rail controller 328 may allow the software developer 302 to upload either a text file or a JSON file (e.g., in the developer tool view 310) indicating the list of impacted JIRAs (e.g., using JIRA identifiers). This list of JIRAs may be provided to a python script (e.g., the impact analysis computer program 334) using a runImpactAnalysis( ) function with the create test rail controller 328. The python script may be used to pull the impacted areas JSON for each JIRA in the list provided by one or more software developers. As each JSON is pulled from the JIRAs, the respective JSON may be added to an output dictionary, which may be in the form of a 2-D matrix. The resultant dictionary may be passed to another python script (e.g., the create test rail computer program 340) where the impacted areas may be parsed based on their regression impact, locations, and affected devices. A test suite may be generated with multiple test runs based on the permutations of devices, locations, and affected features. For example, if a new feature impacts IAP for US marketplace for Device 1 and also impacts the Detail Page for UK/US/DE for Device 2 and Device 1, a test plan may be generated with the following test runs: Device 1—U.S.—Sections IAP/Detail Page; Device 1—U.K.—Sections Detail Page; Device—Germany (DE)—Sections Detail Page; Device 2—U.K.—Sections Detail Page; Device 2—DE—Sections Detail Page.

In one or more embodiments, a single JSON pulled from a JIRA task may indicate the following impacted areas: device names, locations used, software versions, environment and test modules, etc. There may be multiple JIRA tasks impacting the same area (e.g., multiple JIRAs may impact the same devices, locations, software versions, etc.). JIRA tasks may be submitted by multiple software developers, so JIRAs associated with the same impacted areas may be identified and aggregated by the system 200. While aggregating the data from the JSON of the tasks, de-duping (e.g., removing or merging identical entries from two or more data sets) may be appropriate. De-duping may be performed in the following manner: Each JSON may be processed in such a way that a test module name is treated as a key. The resulting output dictionary may be represented by a 2-D matrix where each key is a pair (X,Y) such that X is may be a key identifier associated with a test module name and Y may be a key identifier associated with one of the other impacted areas (JIRA identifier, environment, software versions, devices, etc.). A value of each key-pair may be represented in the form of a list. The list may be created after de-duping with the help of a set. For example, for a test module name X, any impacted device names may be aggregated into a list and then de-duped with a set. The set may be converted to a list and added to the output dictionary in which the respective test module name may be the first key (X), and "deviceFamilies" may be the second key. Values may be populated for other areas such as JIRA identifier, environment, software versions, locations, and additional information for a respective test module name. Once the values are populated for the key-pairs (X,Y), the output dictionary may be sent by the create test rail controller 328 to the create test rail software program 340.

In one or more embodiments, a web application may be the most convenient way of using/displaying the developer tool view 310 and/or the impact assessment view 326. Alternatively or in addition, individual computer programs (e.g., the python scripts) may be executed on the software developer computer 304 and/or the quality assurance computer 308 to determine the risk impact analysis.

Referring the components of the software developer computer 304 and the quality assurance computer 308, the storage 350 and the storage 380 may include removable storage and/or non-removable storage including, but not limited to, magnetic storage, optical disk storage, and/or tape storage. The storage 350 and the storage 380 may provide non-volatile storage of computer-executable instructions and other data. The storage 350 and the storage 380, removable and/or non-removable, are an example of computer-readable storage media (CRSM) as that term is used herein.

The storage 350 may store computer-executable code, instructions, or the like that may be executable by the processing circuitry 341 to cause the processing circuitry 341 to perform or initiate various operations (e.g., operations associated with computer-executable instructions for the one or more developer modules 356). The storage 350 may additionally store data that may be copied for use by the processing circuitry 341 during the execution of the computer-executable instructions. Moreover, output data generated as a result of execution of the computer-executable instructions by the processing circuitry 341 may be copied to the storage 350 for non-volatile storage. The storage 380 may store computer-executable code, instructions, or the like that may be executable by the processing circuitry 370 to cause the processing circuitry 370 to perform or initiate various operations (e.g., operations associated with computer-executable instructions for the one or more quality assurance modules 386). The storage 380 may additionally store data that may be copied for use by the processing circuitry 370 during the execution of the computer-executable instructions. Moreover, output data generated as a result of execution of the computer-executable instructions by the processing circuitry 370 may be copied to the storage 380 for non-volatile storage.

More specifically, the storage 350 may store one or more program module(s), applications, engines, computer-executable code, scripts, or the like. Some or all of these module(s) may be or include sub-module(s). Any of the components depicted as being stored in the storage 350 may include any combination of software, firmware, and/or hardware. The software and/or firmware may include computer-executable code, instructions, or the like that may executed by one or more of the processing circuitry 341. Any of the components depicted as being stored in the storage 350 may support the functionality described in reference to the corresponding components named earlier in this disclosure. The storage 380 may store one or more program module(s), applications, engines, computer-executable code, scripts, or the like. Some or all of these module(s) may be or include sub-module(s). Any of the components depicted as being stored in the storage 380 may include any combination of software, firmware, and/or hardware. The software and/or firmware may include computer-executable code, instructions, or the like that may executed by one or more of the processing circuitry 370. Any of the components depicted as being stored in the storage 380 may support the functionality described in reference to the corresponding components named earlier in this disclosure.

The storage 350 may further store various types of data utilized by the components of the software developer computer 304. Any data stored in the storage 350 may be used by the processing circuitry 341 in executing computer-executable code. In addition, any data depicted as being stored in the storage 350 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like. The storage 380 may further store various types of data utilized by the components of the quality assurance computer 308. Any data stored in the storage 382 may be used by the processing circuitry 370 in executing computer-executable code. In addition, any data depicted as being stored in the storage 380 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like.

The storage 350 may store the one or more developer modules 356. The one or more developer modules 356 may provide executable code for providing a user interface, presenting possible impacted areas for software modification, receiving inputs indicating possible impacted areas, entering risk impact, etc. The storage 380 may store the one or more quality assurance modules 386. The one or more quality assurance modules 386 may provide executable code for providing a user interface, uploading JIRA identifiers into the user interface, creating test runs, providing reports based on impact assessments, providing test results of test runs, etc.

The processing circuitry 341 may be configured to access the storage 350 and execute the computer-executable instructions loaded therein. For example, the processing circuitry 341 may be configured to execute computer-executable instructions of the various program module(s), applications, engines, or the like of the software developer computer 304 to cause or facilitate various operations to be performed in accordance with one or more embodiments of the disclosure. The processing circuitry 370 may be configured to access the storage 380 and execute the computer-executable instructions loaded therein. For example, the processing circuitry 370 may be configured to execute computer-executable instructions of the various program module(s), applications, engines, or the like of the quality assurance computer 308 to cause or facilitate various operations to be performed in accordance with one or more embodiments of the disclosure. The processing circuitry 341 and the processing circuitry 370 may include any suitable processing unit capable of accepting data as input, processing the input data in accordance with stored computer-executable instructions, and generating output data. The processing circuitry 341 and the processing circuitry 370 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 341 and the processing circuitry 370 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 341 and the processing circuitry 370 may be capable of supporting any of a variety of instruction sets.

The software developer computer 304 may further include one or more network interface(s) 346 via which the software developer computer 304 may communicate with any of a variety of other systems, platforms, networks, devices, and so forth. The quality assurance computer 308 may further include one or more network interface(s) 376 via which the quality assurance computer 308 may communicate with any of a variety of other systems, platforms, networks, devices, and so forth. The network interface(s) 346 and 376 may enable communication, for example, with one or more wireless routers, one or more host servers, one or more web servers, and the like via one or more networks. The network interface(s) 346 and 376 may enable communication, for example, with one or more wireless routers, one or more host servers, one or more web servers, and the like via one or more networks.

The transceivers 348 and 378 may include any suitable type of transceiver depending, for example, on the communications protocols used to transmit or receive signals. The transceivers 348 and 378 may additionally, or alternatively, include a Wi-Fi transceiver configured to transmit or receive signals in accordance with established standards and protocols. The transceivers 348 and 378 may include any suitable radio component(s) for transmitting or receiving signals in a bandwidth and/or channels. The transceivers 348 may include any known receiver and baseband suitable for communicating via the communications protocols utilized by the software developer computer 304. The transceivers 378 may include any known receiver and baseband suitable for communicating via the communications protocols utilized by the quality assurance computer 308. The transceivers 348 and 378 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 3 as being stored in the storage 350 and in the storage 380 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the software developer computer 304 or the quality assurance computer 308, and/or hosted on other computing device(s) accessible via one or more networks, may be provided to support the functionality provided by the program module(s), applications, or computer-executable code depicted in FIG. 3 and/or additional or alternate functionality. Further, functionality may be modularized differently such that processing described as being supported collectively by the collection of program module(s) depicted in FIG. 3 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 3 may be implemented, at least partially, in hardware and/or firmware across any number of devices.

It should further be appreciated that the software developer computer 304 or the quality assurance computer 308 may include alternate and/or additional hardware, software, or firmware components beyond those described or depicted without departing from the scope of the disclosure. More particularly, it should be appreciated that software, firmware, or hardware components depicted as forming part of the software developer computer 304 or the quality assurance computer 308 are merely illustrative and that some components may not be present or additional components may be provided in various embodiments. While various illustrative program module(s) have been depicted and described as software module(s) stored in the storage 350 or the storage 380, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The software developer computer 304 may further include one or more buses 364 that functionally couple various components of the software developer computer 304. The quality assurance computer 308 may further include one or more buses 394 that functionally couple various components of the quality assurance computer 308. The bus(es) 364 and 394 may include at least one of a system bus, a memory bus, an address bus, or a message bus, and may permit the exchange of information (e.g., data (including computer-executable code), signaling, etc.) between various components of the software developer computer 304 or the quality assurance computer 308. The bus(es) 364 and 394 may include, without limitation, a memory bus or a memory controller, a peripheral bus, an accelerated graphics port, and so forth. The bus(es) 364 and 394 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The bus(es) 364 and 394 may include at least one of a system bus, a memory bus, an address bus, or a message bus, and may permit the exchange of information (e.g., data (including computer-executable code), signaling, etc.) between various components of the software developer computer 304 or the quality assurance computer 308. The bus(es) 364 and 394 may include, without limitation, a memory bus or a memory controller, a peripheral bus, an accelerated graphics port, and so forth. The bus(es) 364 and 394 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 342 of the software developer computer 304 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 342 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 342 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). The memory 372 of the quality assurance computer 308 may be similar to the memory 342.

More specifically, the storage 350 may store one or more operating systems (O/S) 352; one or more database management systems (DBMS) 354; and one or more program module(s), applications, engines, computer-executable code, scripts, or the like such as, for example, the one or more developer module(s) 356. Some or all of these module(s) may be or include sub-module(s). Any of the components depicted as being stored in the storage 350 may include any combination of software, firmware, and/or hardware. The software and/or firmware may include computer-executable code, instructions, or the like that may be loaded into the memory 342 for execution by one or more of the processor(s) 341. Any of the components depicted as being stored in the storage 350 may support the functionality described in reference to the corresponding components named earlier in this disclosure.

The storage 350 may further store various types of data utilized by the components of the software developer computer 304. Any data stored in the storage 350 may be loaded into the memory 342 for use by the processor(s) 341 in executing computer-executable code. In addition, any data depicted as being stored in the storage 350 may potentially be stored in one or more datastore(s) and may be accessed via the DBMS 354 and loaded in the memory 342 for use by the processor(s) 341 in executing computer-executable code.

Referring now to other illustrative components depicted as being stored in the storage 350, the O/S 352 may be loaded from the data storage 350 into the memory 342 and may provide an interface between other application software executing on the software developer computer 304 and the hardware resources of the software developer computer 304. More specifically, the O/S 352 may include a set of computer-executable instructions for managing the hardware resources of the software developer computer 304 and for providing common services to other application programs (e.g., managing memory allocation among various application programs). In certain example embodiments, the O/S 352 may control execution of the other program module(s) to dynamically enhance characters for content rendering.

The DBMS 354 may be loaded into the memory 342 and may support functionality for accessing, retrieving, storing, and/or manipulating data stored in the memory 342 and/or data stored in the storage 350. The DBMS 354 may use any of a variety of database models (e.g., relational model, object model, etc.) and may support any of a variety of query languages. The DBMS 354 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the software developer computer 304, the input/output (I/O) interface(s) 344 may facilitate the receipt of input information by the software developer computer 304 from one or more I/O devices as well as the output of information from the software developer computer 304 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the software developer computer 304 or may be separate. The I/O devices may further include, for example, any number of peripheral devices such as data storage devices, printing devices, and so forth. The I/O interface(s) 344 may also include an interface for an external peripheral device connection such as HDMI, universal serial bus (USB), micro-USB, FireWire, Thunderbolt, Ethernet port or other connection protocol that may connect to one or more networks. The I/O interface(s) 374 of the quality assurance computer 308 may be similar to the I/O interface(s) 344.

The controller(s) 358 may be any microcontroller or microprocessor configured to control one or more operations of the software developer computer 304. The controller(s) 388 of the quality assurance computer 308 may be similar to the controller(s) 358. The power supply 360 may be a battery, such as a lithium-ion battery. The power supply 360 may be provided power from a power receptacle or other power charging device. The power supply 390 of the quality assurance computer 308 may be similar to the power supply 360.

The software developer computer 304 may optionally include one or more antenna(e) 362 and the quality assurance computer 308 may include one or more antenna(e) 392 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth. The one or more antenna(e) 392 may be similar to the one or more antenna(e) 362.

Figure 4:
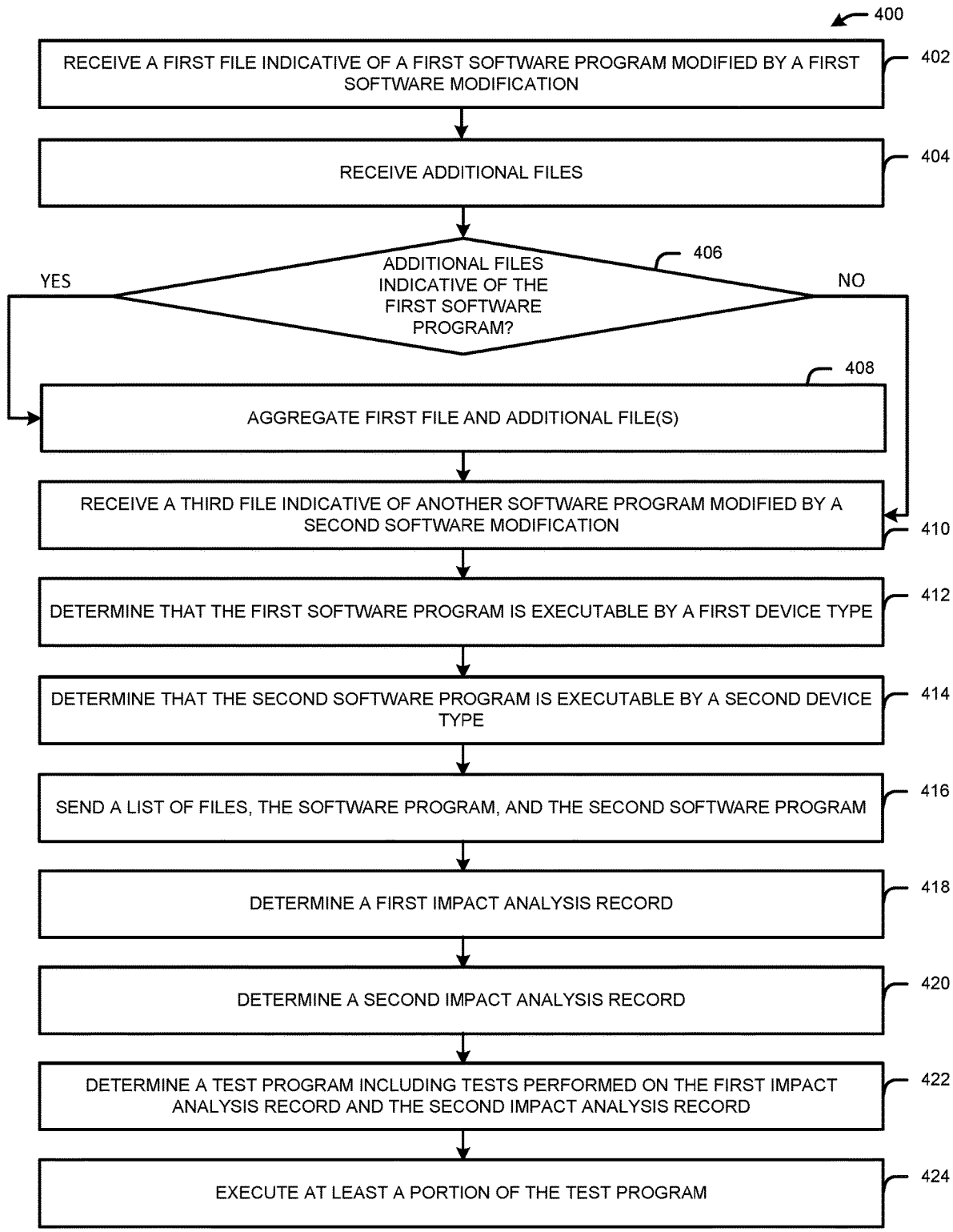
FIG. 4 illustrates a flow diagram for a process for determining an impact assessment for a proposed software modification, in accordance with one or more example embodiments of the present disclosure.

FIG. 4 illustrates a flow diagram for a process 400 for determining an impact assessment for a proposed software modification, in accordance with one or more example embodiments of the present disclosure.

At block 402, processing circuitry of a device, (e.g., the developer computer 304 of FIG. 3) may receive a first JIRA or other file (e.g., a project management file) indicative of one or more software programs/modules which may be modified by a first software modification. A software developer may, using a user interface on a computer, enter features/programs/modules which may be impacted by a proposed software modification. For example, if the software developer uses a JIRA or another type of file to enter a feature expected to be affected by a change in existing software proposed by the software developer, the JIRA may be updated and stored (e.g., in the project management files 316 of FIG. 3). A risk impact controller (e.g., risk impact controller 312 of FIG. 3) may use software functions to populate a JIRA based on the software developer inputs. If a device type, device location, software version, or other anticipated area anticipated to be modified by a proposed software modification is input by a software developer, the risk impact controller may add the affected areas to one or more JIRAs. The device may receive the JIRAs and determine impacted areas based on the indications of the inputs provided by one or more software developers.

At block 404, the processing circuitry of the device may receive one or more additional JIRAs/other types of files, including a second JIRA/project management file. The second JIRA may indicate one or more common software programs also indicated by the first JIRA, and may indicate one or more other software programs different than those indicated by the first JIRA. Other JIRAs may indicate different software programs which may be impacted by the same software modification or another software modification. The device may receive and analyze multiple JIRAs, and may determine when multiple JIRAs indicate that common software programs may be impacted by software modifications. When multiple software programs are indicated by JIRAs to be impacted by software modifications proposed by software developers, the device may determine other impacted areas using multiple JIRAs. For example, if a user interface module is indicated by the first and second JIRAs, software version 1 is indicated by the first JIRA, and software version 2 is indicated by the second JIRA, then the device may aggregate the data to determine all areas (e.g., including both software version 1 and software version 2) impacted by a modification.

At block 406, the processing circuitry of the device may determine if any JIRAs/files indicate the first software program. If so, any JIRAs indicating an impact of the first software program may be aggregated with the first JIRA file at block 408. Any additional information in the JIRAs indicating the first software program, such as device types/families, locations where the software program may be used, software versions, etc. may be aggregated into a record associated with the first software program and any auto-populated sub-programs associated with the first software program. If the first JIRA is the only JIRA indicating the first software program, the process 400 may continue to block 410.

At block 410, the processing circuitry of the device may receive a third JIRA file/project management file indicative of another software program modified by a second software modification. The second software program may be different from the first software program and may include the same and/or different additional information such as device types/families, locations, software versions, etc.

At block 412, the processing circuitry of the device may determine that the first software program is executable by one or more device types/families. For example, one JIRA/file may indicate that a software program is used by device type 1, and another JIRA/file may indicate that the same software program may be used by device type 2. By collecting information from multiple JIRAs as input by software developers, the device may determine all the devices anticipated to be affected by a proposed software modification. The device also may determine all the sub-programs, locations, software versions, and JIRAs affected by a proposed software modification by analyzing multiple JIRAs.

At block 414, the processing circuitry of the device may determine that the second software program is executable by a second device type which may be the same as or different than the first device type. For example, one JIRA/file may indicate the first software program and another JIRA may indicate a second software program. JIRAs/files with common software programs may be aggregated into a record, and JIRAs with different software programs may be stored in separate records.

At block 416, the processing circuitry of the device may send a list of JIRAs/files and the software programs expected to be affected by a proposed software modification. Other areas such as device types, locations, software versions, etc. may be presented. If a software program may be used by multiple device types in multiple locations and may be supported by multiple software versions, then any such areas may be presented to facilitate software impact testing. The presentation may be on the device or on another device, and may be presented in a user interface.

At block 418, the processing circuitry of the device may determine a first impact analysis record. The record may include all information from JIRAs/files indicative of the first software program. This way, any device families/types, locations, software versions, etc. in different JIRAs may be grouped in the record as long as the JIRAs have the same software program.

At block 420, the processing circuitry of the device may determine a second impact analysis record. The record may include all information from JIRAs/files indicative of the second software program. This way, any device families/types, locations, software versions, etc. in different JIRAs may be grouped in the record as long as the JIRAs have the same software program.

At block 422, the processing circuitry of the device may determine a test program. The test program may include one or more tests for the information in the first record and one or more tests for the information in the second record (e.g., a test program for user interface software, parental control software, user insider software, and any associated device types, geographic locations of use, software versions, etc.). A python script, for example, may be used to pull the impacted areas JSON for JIRAs/files in the list of JIRAs/files. As a JSON is received from a JIRA, the JSON may be added to an output dictionary (e.g., a 2-D matrix). The resultant dictionary may be then passed into a script (e.g., a create_testrail.py script via createTestrail( )), in which the impacted areas indicated by JIRAs may be parsed based on their regression impact, locations, and device types. The device may create a test suite with multiple test runs based on the permutations of devices, locations of the devices, and affected features. The device may receive an input indicative of a request to perform an impact analysis on the list of JIRAs and the affected software programs. For example, a user presented with the impacted areas of a software modification may provide an input indicating a preference to perform an impact analysis on one or more of the impacted areas shown. The input may be provided by the user interface. The input may cause the device to send an impact analysis command to a computer script (e.g., python script). The command may indicate the impacted areas on which to perform an impact analysis to determine the affected areas of a proposed software modification. The list of JIRAs may be sent to the python script (e.g., run_impact_analysis.py) via a function (e.g., runImpactAnalysis( )). The python script may be used to pull the impacted areas respective JSON for each JIRA in the list. A single JSON pulled from a JIRA task may include the following impacted areas: device names, locations, software versions, environment, and test modules. There may be multiple JIRA tasks impacting the same area.

At block 424, the processing circuitry of the device may execute at least a portion of the test program. The device may cause presentation, at the device or another device, of a list of JIRAs associated with the software modification. The python script may return the areas indicated by JIRA JSONs after aggregating the impacted areas as indicated by the JIRAs/files. The presented JIRAs and their affected areas may be presented to a user for selection of tests to perform on the areas expected to be impacted by a proposed software modification. The tests may be presented to a user to select for execution. The tests may be presented on the device or on another device in a user interface. The user interface may present the test programs which may be selected by a user or automatically selected for execution. An output of the executed tests may indicate a regression (e.g., whether the existing software program/feature is compatible with the proposed software modification).

Figure 5:
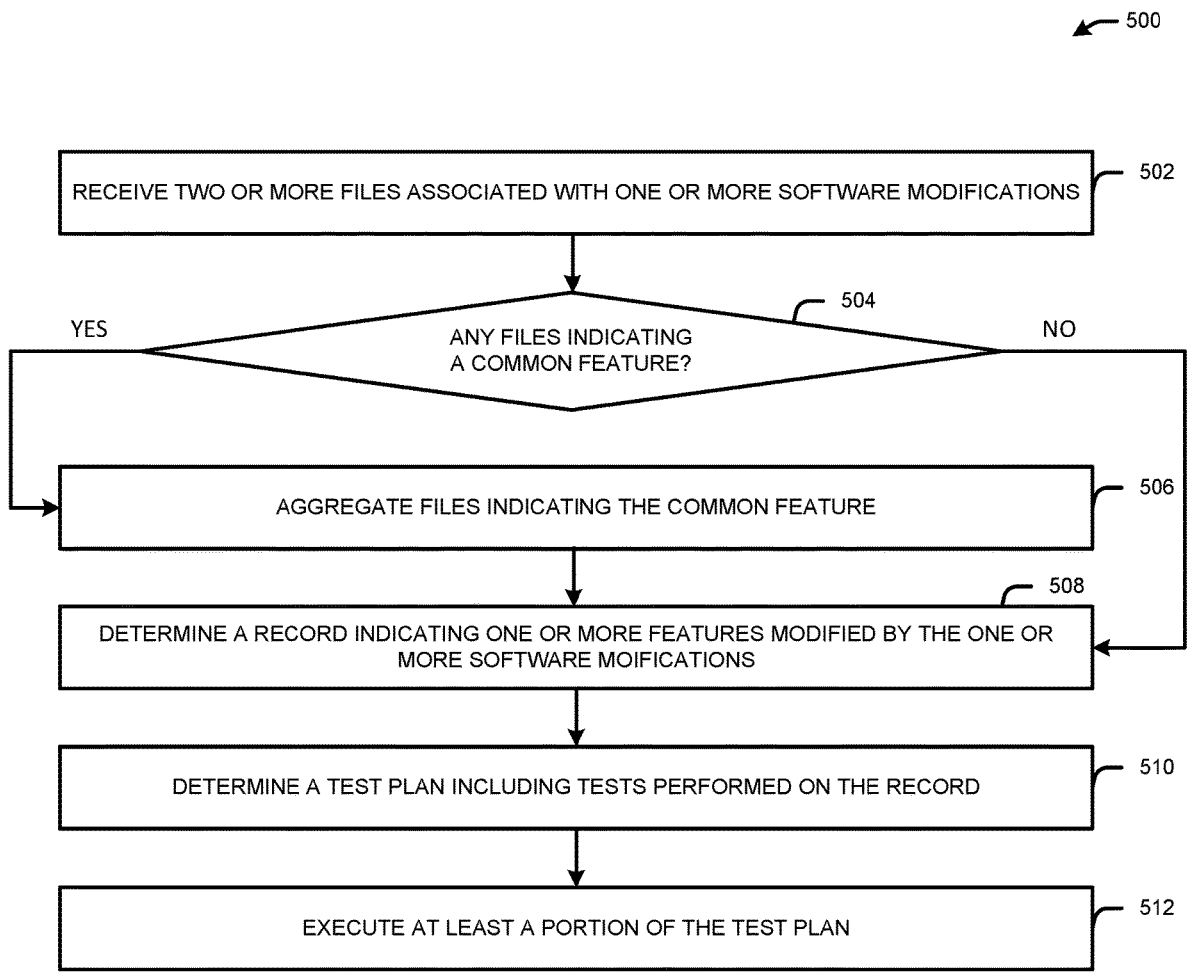
FIG. 5 illustrates a flow diagram for a process for determining an impact assessment for a proposed software modification, in accordance with one or more example embodiments of the present disclosure.

FIG. 5 illustrates a flow diagram for a process 500 for determining an impact assessment for a proposed software modification, in accordance with one or more example embodiments of the present disclosure.

At block 502, processing circuitry of a device, (e.g., the developer computer 304 of FIG. 3) may receive two or more JIRA files indicating one or more software programs which may be modified by one or more proposed software modifications. A software developer may, using a user interface on a computer, enter features/programs/modules which may be impacted by a proposed software modification. For example, if the software developer uses a JIRA to enter a feature expected to be affected by a change in existing software proposed by the software developer, the JIRA may be updated and stored (e.g., in the project management files 316 of FIG. 3). A risk impact controller (e.g., risk impact controller 312 of FIG. 3) may use software functions to populate a JIRA based on the software developer inputs. If a device type, device location, software version, or other anticipated area anticipated to be modified by a proposed software modification is input by a software developer, the risk impact controller may add the affected areas to one or more JIRAs. The device may receive the JIRAs and determine impacted areas based on the indications of the inputs provided by one or more software developers.

At block 504, the processing circuitry of the device may determine whether any additional JIRA files received may indicate a common feature. For example, JIRAs may indicate the same feature or a different feature than any other JIRA. JIRAs with the same feature may be aggregated to create a data record. JIRAS with different features may be included in different data records. If multiple JIRAs indicate common software programs or other features which a software developer indicates as possibly being affected by a proposed software modification, then the software programs and other features may be identified and aggregated for an impact analysis to focus testing on those features rather than having to test every feature when indicated by a JIRA. If JIRA files indicate a common feature, the process 500 may continue to block 506 where the information such as device families/types, locations, software versions, etc. may be aggregated and stored in a common record. If no common feature is indicated by multiple JIRAs, then the process 500 may continue to block 508.

At block 508, the processing circuitry of the device may determine a record indicating a common feature modified by a proposed software modification, and the associated information such as device families/types, locations, software versions, etc. Using the JIRAs and their respective JSONs, the device may identify any device features which the JIRAs indicate as possibly being modified by a software modification. For example, the device features may include software programs and modules such as controls, user interfaces, links, insider offers, etc. The features indicated by JIRAs may be aggregated by analyzing multiple JIRAs and JSONs. The features may include sub-features, device types/families, locations, software versions, and JIRA identifiers, and such may be identified with the set of device features.

At block 510, the processing circuitry of the device may determine a test plan associated with the software modification and including tests performed in the record based on the information in the record (e.g., tests performed on the indicated software program/feature). A user may input, at the device or another device, a request to generate a test plan for the set of device features indicated as being impacted by a software modification. The set of device features may map to test plans for one or more of the device features and associated information indicated by the record, and the test plans may be determined based on the selected device features and information. The input may indicate all or a set of the device features to test, and the selected features may be associated with tests selected for the test plan.

At block 512, the processing circuitry of the device may execute at least a portion of the test plan once the test plan has been generated. A user interface on the device or another device may present the tests which may be used to analyze the impact on the set of device features selected for testing. The presentation may include an optional input for a user to indicate whether to execute/perform the tests. The user may indicate any test to be performed, and the tests may be performed automatically or in response to a user input. An output of the executed tests may indicate a regression (e.g., whether the existing software program/feature is compatible with the proposed software modification).

Figure 6:
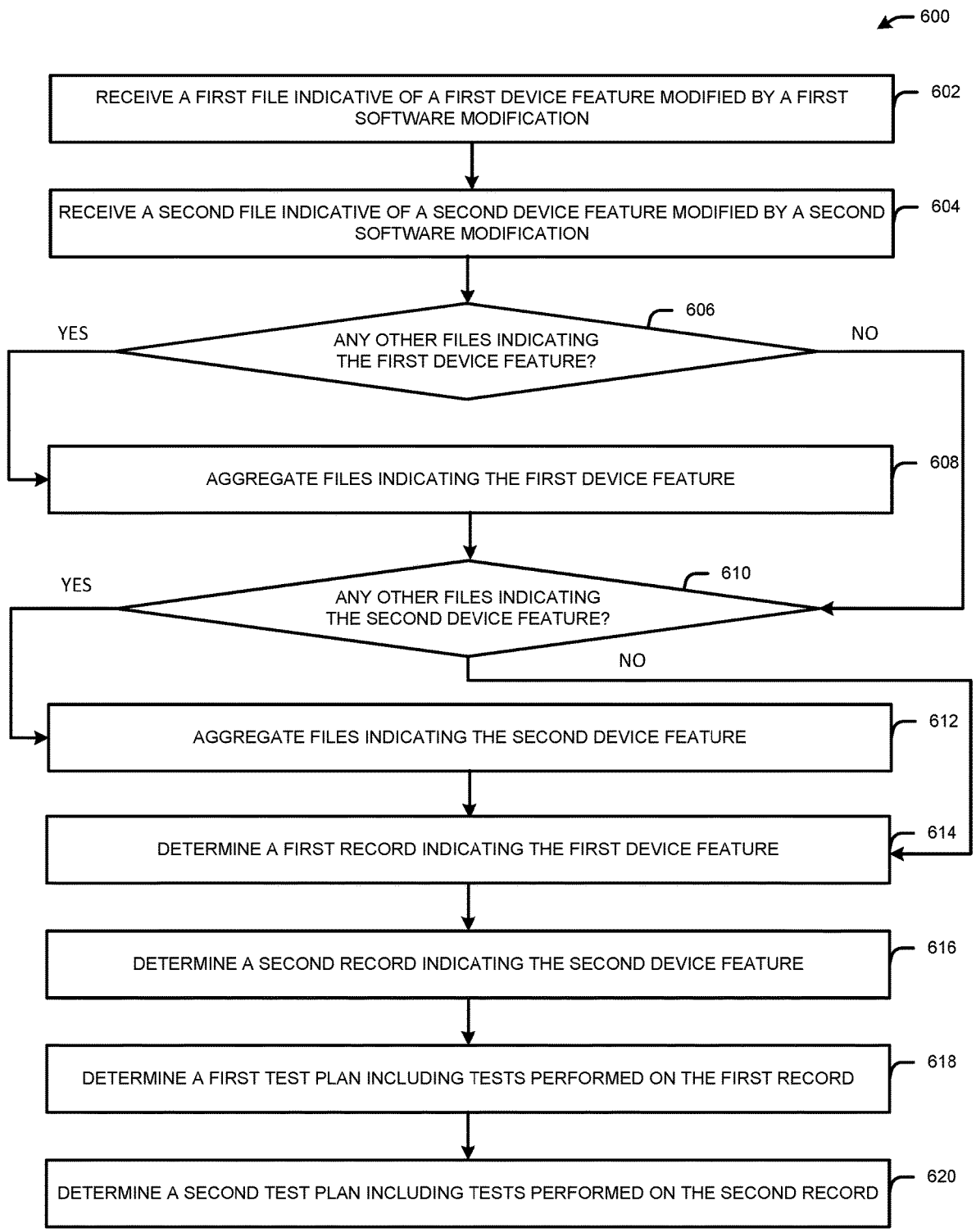
FIG. 6 illustrates a flow diagram for a process 600 for determining an impact assessment for a proposed software modification, in accordance with one or more example embodiments of the present disclosure.

FIG. 6 illustrates a flow diagram for a process 600 for determining an impact assessment for a proposed software modification, in accordance with one or more example embodiments of the present disclosure.

At block 602, processing circuitry of a device, (e.g., the developer computer 304 of FIG. 3) may receive one or more files (e.g., JIRA files or JSONs of JIRAs) indicating a first device feature (e.g., a software program/module) which may be modified by a first proposed software modification. A software developer may, using a user interface on a computer, enter features/programs/modules which may be impacted by a proposed software modification. For example, if the software developer uses a JIRA to enter a feature expected to be affected by a change in existing software proposed by the software developer, the JIRA may be updated and stored (e.g., in the project management files 316 of FIG. 3). A risk impact controller (e.g., risk impact controller 312 of FIG. 3) may use software functions to populate a JIRA based on the software developer inputs. If a device type, device location, software version, or other anticipated area anticipated to be modified by a proposed software modification is input by a software developer, the risk impact controller may add the affected areas to one or more JIRAs. The device may receive the JIRAs and determine impacted areas based on the indications of the inputs provided by one or more software developers.

At block 604, the processing circuitry of the device may receive another file indicating another device feature which may be modified by a second proposed software modification. For example, multiple modifications may impact some of the same features and may impact different features. One modification may impact a first version of software, and another modification may impact a second version of the software. A newer device may support either or both of the first and second software versions. The files may indicate which features may be impacted by different software modifications.

At block 606, the processing circuitry of the device may determine if any other JIRAs indicate the first device feature. If so, the process 600 may continue to block 608. If not, the process may continue to block 610. At block 608, JIRAs indicating the first device feature may be aggregated. Any JIRA indicating the first device feature may include sub-features, device types/families, locations, software versions, etc., and such information may be aggregated into a record associated with the first device feature.

At block 610, the processing circuitry of the device may determine if any other JIRAs indicate the second device feature. If so, the process 600 may continue to block 612. If not, the process may continue to block 614. At block 612, JIRAs indicating the second device feature may be aggregated. Any JIRA indicating the second device feature may include sub-features, device types/families, locations, software versions, etc., and such information may be aggregated into a record associated with the second device feature.

At block 614, the processing circuitry of the device may determine a first record indicating the first device feature and information modified by a proposed software modification. Using the JIRAs and their respective JSONs, the device may identify any device features which the JIRAs indicate as possibly being modified by a software modification. For example, the device features may include software programs and modules such as controls, user interfaces, links, insider offers, etc. The record may indicate the program/module indicated as impacted by a software modification, along with possibly impacted software sub-features, device types, geographic locations associated with use of the program/module, software versions, and other information. The features indicated by JIRAs may be aggregated by analyzing multiple JIRAs and JSONs. The features may include sub-features, device types/families, locations, software versions, and JIRA identifiers, and such may be identified with the set of device features.

At block 616, the processing circuitry of the device may determine a second record indicating the second device feature and information modified by a proposed software modification. Any JIRAs indicating the second device feature may be aggregated, and their device types/families, locations, software versions, etc. may be indicated by the record.

At block 618, the processing circuitry of the device may determine a test plan associated with the first software modification and including tests to perform on the first record and its associated information, such as the software programs/features indicated as being impacted by a proposed software modification. A user may input, at the device or another device, a request to generate a test plan for the set of device features indicated as being impacted by a software modification. The set of device features may map to test plans for one or more of the device features, and the test plans may be determined based on the selected device features. The input may indicate all or a set of the device features to test, and the selected features may be associated with tests selected for the test plan.

At block 620, the processing circuitry of the device may determine a test plan associated with the second software modification and including tests to perform on the second record and its associated information. The second record may use some of the same or different tests than the tests for the first record because of the different respective features and/or information such as device types/families, locations, software versions, etc. An output of the executed tests of the test plans may indicate a regression (e.g., whether the existing software program/feature is compatible with the proposed software modification).

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD- ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, at a first device, a first JIRA file including indications of a first software program and a first device type associated with executing the first software program, wherein the first JIRA file indicates that the first software program includes a first user interface software modification;
   receiving a second JIRA file including an indication that the first software program includes a second user interface software modification;
   receiving a third JIRA file indicating a second software program and a second device type associated with executing the second software program, wherein the second JIRA file indicates that the second software program includes a parental control software modification;
   generating a list of received JIRA files including the first JIRA file, the second JIRA file, and the third JIRA file;
   determining a first impact analysis record indicative of JIRA files that include modifications impacting the first software program, the first impact analysis record including indications of the first user interface software modification and the second user interface software modification;
   determining a second impact analysis record indicative of JIRA files that include modifications impacting the second software program;
   determining a user interface compatibility test program based on the first impact analysis record, wherein the user interface compatibility test program includes one or more tests to be performed on the first software program;
   determining a parental control compatibility test program based on the second impact analysis record, wherein the parental control test program includes one or more tests to be performed on the second software program;
   executing the user interface compatibility test program;
   determining, based on output of the user interface compatibility test program, that the first user interface software modification is compatible with the first software program and the first device type;
   executing the parental control compatibility test program; and
   determining, based on output of the parental control compatibility test program, that the parental control software modification is compatible with the second software program and the second device type.

2. The method of claim 1, wherein the first JIRA file includes a first JavaScript Object Notation (JSON), wherein the first JSON includes a first key identifier associated with the first software program, wherein the second JIRA file includes a second JSON, wherein the second JSON includes a second key identifier associated with the first software program, the method comprising:
   determining that the first key identifier is a duplicate of the second key identifier; and
   generating a list of key identifiers including the first key identifier and excluding the second key identifier, wherein the user interface compatibility test program is based on the list of key identifiers.

3. The method of claim 1, further comprising:
   analyzing a first impact of the user interface software modification on the first software program, wherein analyzing the first impact comprises determining a result of the first user interface software modification; and
   analyzing a second impact of the parental control software modification on the second software program, wherein analyzing the second impact comprises determining a result of the parental control software modification.

4. The method of claim 1, further comprising determining that the first software program is executable by a third device type different from the first device type and the second device type, wherein the first impact analysis record further includes an indication of the third device type.

5. A method, comprising:
   receiving, at a device, two or more files associated with one or more software modifications, the two or more files including:
      a first file including indications of: (i) first modifications to a software feature by the one or more software modifications, (ii) first modifications to a software sub-feature by the one or more software modifications, and (iii) a first device type associated with the one or more software modifications; and
      a second file including indications of: (i) second modifications to the software feature by the one or more software modifications, (ii) second modifications to the software sub-feature by the one or more software modifications, and (iii) a second device type associated with the one or more software modifications;
   determining a record based on the first file and the second file, wherein the record includes indications of: (i) the software feature, (ii) the software sub-feature, (iii) the first device type, and (iv) the second device type;
   determining a test plan based on the record, wherein the test plan includes one or more computer-executable software tests performed on the software feature; and
   executing at least a portion of the test plan.

6. The method of claim 5, wherein the first file is a first JIRA file, and wherein the second file is a second JIRA file.

7. The method of claim 5, wherein the software feature comprises at least one of a user interface feature, a parental control feature, an in-application purchase feature, or a product detail page.

8. The method of claim 5, wherein the software feature is a first software feature, further comprising receiving a third file that includes an indication of third modifications to a second software feature by the one or more software modifications.

9. The method of claim 5, wherein the software feature is a first software feature, the software sub-feature is a first software sub-feature, wherein the record is a first record, and wherein the test plan is a first test plan, further comprising:
receiving additional files, wherein the additional files include:
a third file including indications of: (i) third modifications to the first software feature by the one or more software modifications, (ii) third modifications to the first software sub-feature by the one or more software modifications, and (iii) a third device type associated with the one or more software modifications, wherein the first record further includes an indication of the third device type, and
a fourth file including indications of: (i) fourth modifications to a second software feature by the one or more software modifications, (ii) fourth modifications to a second software sub-feature by the one or more software modifications, and (iii) a fourth device type associated with the one or more software modifications;
determining a second record including indications of: (i) the second software feature, (ii) the second software sub-feature, and (iii) the fourth device type;
determining a second test plan based on the second record, wherein the second test plan includes one or more computer-executable software tests performed on the second software feature; and
executing at least a portion of the second test plan.

10. The method of claim 5, further comprising analyzing an impact of the one or more software modifications on the software feature, wherein analyzing the impact comprises determining the one or more computer-executable software tests.

11. The method of claim 5, wherein the one or more software modifications comprises a first software modification, wherein the software feature is a first software feature and the software sub-feature is a first software sub-feature, further comprising receiving a third file including indications of: (i) third modifications to a second software feature, (ii) third modifications to a second software sub-feature, and (iii) a third device type associated with the one or more software modifications, wherein the first file, the second file, and the third file are associated with the first software modification.

12. The method of claim 5, wherein the first file further includes an indication of a first geographic location associated with use of the software feature, wherein the second file further includes an indication of a second geographic location associated with use of the software feature, wherein the first geographic location is different than the second geographic location, wherein the test plan is based on the first geographic location and the second geographic location.

13. The method of claim 5, wherein the first file further includes an indication of a first software version, wherein the second file further includes an indication of a second software version, wherein the first software version is different than the second software version, and wherein the test plan is based on the first software version and the second software version.

14. The method of claim 5, wherein the first file further includes an indication of a first software version, wherein the second file further includes an indication of a second software version, wherein the first software version is the same as the second software version, and wherein the test plan is based on the first software version.

15. The method of claim 5, wherein the first file is associated with a first key identifier for the first device type, wherein the second file is associated with a second key identifier for the second device type, further comprising:
determining that the first key identifier is a duplicate of the second key identifier; and
generating a list of key identifiers including the first key identifier and excluding the second key identifier, wherein the test plan is based on the list of key identifiers.

16. A device comprising memory and at least one processor, the at least one processor configured to:
receive two or more files associated with one or more software modifications, the two or more files including:
a first file including indications of: (i) first modifications to a software feature by the one or more software modifications, (ii) first modifications to a software sub-feature by the one or more software modifications, and (iii) a first device type associated with the one or more software modifications; and
a second file including indications of: (i) second modifications to the software feature by the one or more software modifications, (ii) second modifications to the software sub-feature by the one or more software modifications, and (iii) a second device type associated with the one or more software modifications;
determine a record based on the first file and the second file, wherein the record includes indications of: (i) the software feature, (ii) the software sub-feature, (iii) the first device type, and (iv) the second device type;
determine a test plan, based on the record, wherein the test plan includes one or more computer-executable software tests performed on the software feature; and
execute at least a portion of the test plan.

17. The device of claim 16, wherein the first file is a first JIRA file, and wherein the second file is a second JIRA file.

18. The device of claim 16, wherein the at least one processor is configured to determine a user input indicating a first test of the one or more tests, wherein the at least a portion of the test plan comprises the first test.

19. The device of claim 16, wherein the first file is associated with a first key identifier for the first device type, wherein the second file is associated with a second key identifier for the second device type, wherein the at least one processor is configured to:
determine that the first key identifier is a duplicate of the second key identifier; and
generate a list of key identifiers including the first key identifier and excluding the second key identifier, wherein the test plan is based on the list of key identifiers.

20. The device of claim 16, wherein the software feature is a first software feature, wherein the at least one processor is configured to receive a third file that includes indications of third modifications to a second software feature by the one or more software modifications.

* * * * *